(12) United States Patent  
Sharma

(10) Patent No.: US 7,951,426 B2
(45) Date of Patent: May 31, 2011

(54) HYDROPHILIC COATING AND METHOD OF MAKING SAME

(75) Inventor: Pramod K. Sharma, Ann Arbor, MI (US)

(73) Assignee: Guardian Industries Corp., Auburn Hills, MI (US)

(*) Notice: Subject to any disclaimer, the term of this patent is extended or adjusted under 35 U.S.C. 154(b) by 1156 days.

(21) Appl. No.: 11/637,940

(22) Filed: Dec. 13, 2006

(65) Prior Publication Data

US 2008/0141694 A1 Jun. 19, 2008

(51) Int. Cl.
*B05D 1/36* (2006.01)

(52) U.S. Cl. .............. 427/407.1; 427/407.2; 427/384

(58) Field of Classification Search .......... 427/407.1, 427/164, 165; 428/426; 62/248
See application file for complete search history.

(56) References Cited

U.S. PATENT DOCUMENTS

| | | | |
|---|---|---|---|
| 3,726,703 A | 4/1973 | Dornte | |
| 3,766,299 A | 10/1973 | Dornte | |
| 3,849,179 A | 11/1974 | Morningstar | |
| 3,867,175 A * | 2/1975 | Dornte | 428/412 |
| 3,963,806 A | 6/1976 | Dornte | |
| 4,927,869 A * | 5/1990 | Dana et al. | 523/502 |
| 6,284,377 B1 | 9/2001 | Veerasamy | |
| 6,303,225 B1 | 10/2001 | Veerasamy | |
| 6,592,992 B2 | 7/2003 | Veerasamy | |
| 6,878,403 B2 | 4/2005 | Veerasamy et al. | |
| 7,012,115 B2 | 3/2006 | Asahina et al. | |
| 7,033,649 B2 | 4/2006 | Veerasamy | |
| 2004/0258912 A1 * | 12/2004 | Piret et al. | 428/375 |
| 2007/0077399 A1 * | 4/2007 | Borowiec et al. | 428/195.1 |

* cited by examiner

*Primary Examiner* — Michael Barr
*Assistant Examiner* — Robert S Walters, Jr.
(74) *Attorney, Agent, or Firm* — Nixon & Vanderhye P.C.

(57) ABSTRACT

Methods of making hydrophilic coatings having anti-fog properties, and hydrophilic articles are provided. In certain example instances, a substrate supports a surfactant and polyethylenimine. The method includes forming a polyethylenimine-solvent mixture; applying a surfactant to a surface of the substrate; and applying the polyethylenimine-solvent mixture to the dried surfactant on the surface of the substrate. After drying or curing, the resulting coating may be hydrophilic thereby allowing water or the like to easily shed therefrom (e.g., providing anti-fog properties).

26 Claims, 2 Drawing Sheets

HYDROPHILIC COATING AND METHOD OF MAKING SAME

Certain example embodiments of the present invention relate to hydrophilic and/or super hydrophilic surface coatings. In certain example embodiments of this invention, such hydrophilic coatings may be used in the context of an interior surface of a glass-based freezer door, or in any other suitable application.

BACKGROUND OF THE INVENTION

The wettability of coatings may play a role in nature and technology. Hydrophilic coatings (coatings with a low contact angle) may be useful for self-cleaning surfaces as well as in anti-fog and/or anti-mist applications. Titania-based hydrophilic coatings may be used, although they occasionally may suffer from possible disadvantages, such as a short lifetime of the hydrophilic nature and/or activation through exposure to ultraviolet (UV) radiation. Additionally, these coatings may require a very high temperature to cure, which may, in turn, increase the manufacturing costs as well as the cost of the final product. Furthermore, a high cure temperature may prevent these coatings from being reasonably and/or practically deposited on certain substrates, such as plastic substrates.

BRIEF DESCRIPTION OF THE INVENTION

In an example embodiment of this invention, there is provided a method of making a hydrophilic coating having anti-fog properties for use in a freezer door application, or in any other suitable application such as other window contexts. The method includes (i) dissolving polyethylenimine in water to form a polyethylenimine-water mixture and optionally mixing the polyethylenimine-water mixture; (ii) applying a non-ionic surfactant to a surface of a substrate and drying the surface of the substrate to form a first layer; and (iii) applying the polyethylenimine-water mixture to a dried nonionic surfactant on the first layer and drying the polyethylenimine-water mixture to form a second layer. The second layer is hydrophilic in certain example embodiments (i.e., low contact angle). Step (i) may occur either before or after step (ii).

In another example embodiment of this invention, there is provided a method of making a hydrophilic coating having anti-fog properties. The method includes (i) dissolving polyethylenimine in a solvent to form a polyethylenimine-solvent mixture and optionally mixing the polyethylenimine-solvent mixture; (ii) applying a nonionic surfactant to a surface of a substrate and drying the surface of the substrate to form a first layer; and (iii) applying the polyethylenimine-solvent mixture to dried nonionic surfactant on the first layer and drying the polyethylenimine-water mixture to form a second layer. The second layer is hydrophilic. Step (i) may occur either before or after step (ii).

In yet another example embodiment of this invention, there is provided a substrate having at least a hydrophilic coating thereon, directly or indirectly. The substrate supports a first layer including a nonionic surfactant and a second layer including polyethylenimine. In addition, the nonionic surfactant layer supports the polyethylenimine layer, and the polyethylenimine inclusive layer is hydrophilic (i.e., low contact angle, at least initially).

In certain example instances where the coating is used as an interior surface coating on a freezer door for example, the hydrophilic nature of the coating is advantageous in that it keeps water (and thus ice) from collecting on the interior surface of the freezer door thereby keeping the door substantially transparent for persons to be able to see clearly through the door into the freezer interior. Moreover, the surfactant may be advantageous in that it can improve durability and/or adhesion of the coating to the substrate (e.g., glass or plastic substrate).

DETAILED DESCRIPTION OF THE INVENTION

Figure 1:
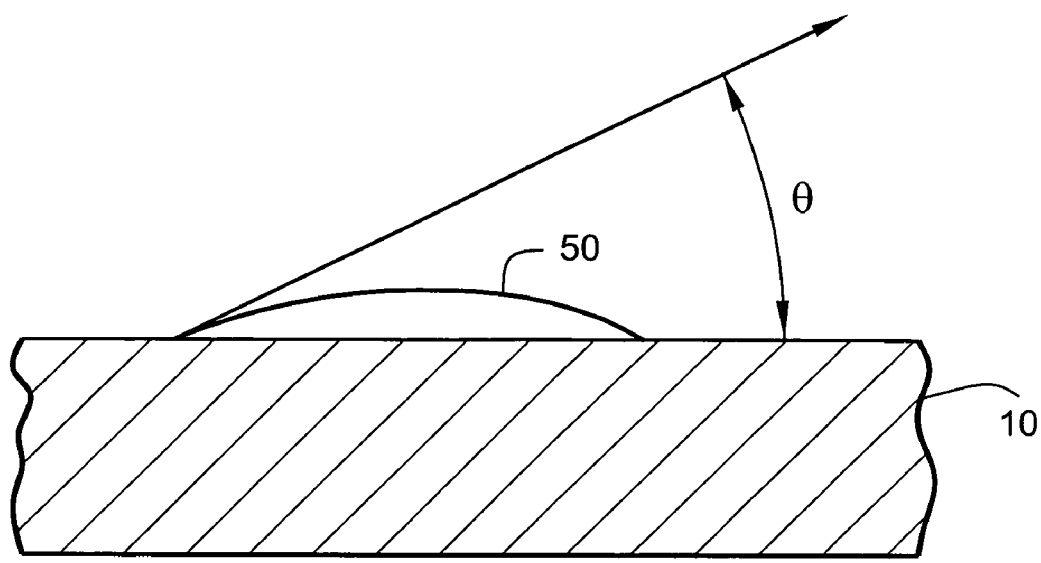
FIG. 1 is a generically illustrates a substrate and fluid drop (e.g., a sessile drop of water), and contact angle $\theta$ formed between the drop and substrate.

FIG. 1 generically illustrates a substrate 10 (e.g., plastic or glass substrate) and fluid drop 50 (e.g., a sessile drop of water) on the substrate 10, and contact angle $\theta$ formed between drop 50 and substrate 10. Hydrophilic performance in any of the described and claimed embodiments is a function of contact angle $\theta$, surface energy $\gamma$, and/or wettability or adhesion energy W. The surface energy $\gamma$ of substrate 10 may be calculated by measuring its contact angle $\theta$.

Figure 2:
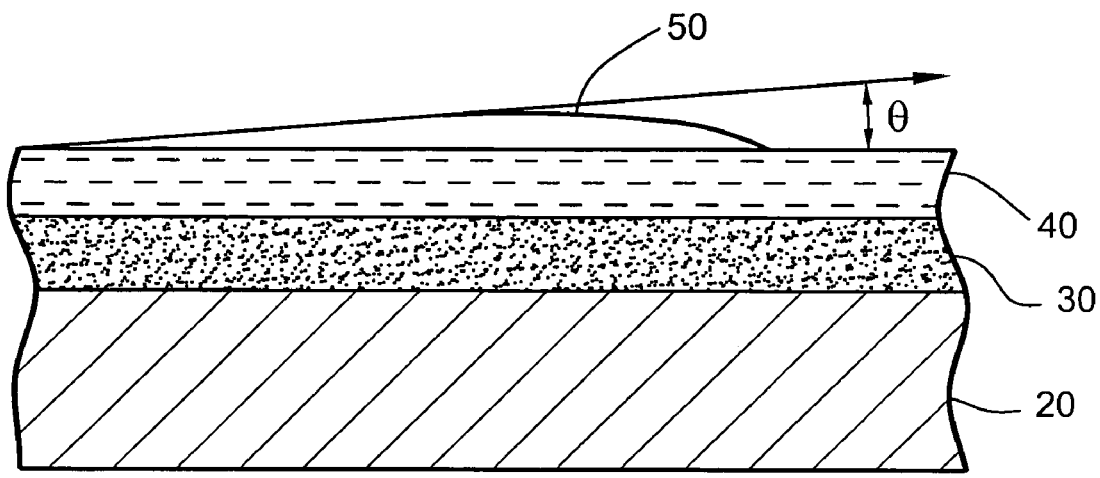
FIG. 2 generically illustrates an example embodiment of the present invention including a hydrophilic contact angle $\theta$.

FIG. 2 generically illustrates an embodiment of the present invention. Substrate 20 supports a coating of a surfactant-based layer 30. Substrate 20 may, for example, comprise glass and/or plastic. Substrate 20 may, for example, consist of a single material. Alternatively, substrate 20 may comprise multiple materials, preferably in layers. Although substrate 20 is depicted as directly supporting (that is, in direct contact with) surfactant-based layer 30, indirect or partial support are also contemplated. The surfactant-based layer 30 may be a nonionic layer, such as one comprising Chemwet 29 available from ChemCor, Inc., which is believed to be a fluoroalkyl substituted polyethylene glycol in water with 1,4 dioxane (<0.1 wt %). Chemwet 29 is a surfactant-based solution that can clean glass and may potentially act as an interfering layer to partially improve wetting, properties, and adhesion. Surfactant-based layer 30 supports a coating 40 comprising PEI (i.e., polyethylenimine or $(C_2H_5N)_n$). It is noted that layers 30 and 40 may or may not be in directly contact in different embodiments of this invention. Likewise, layer 30 may or may not be in direct contact with substrate 20 in different embodiments of this invention (e.g., there may be other layer(s) therebetween).

Coating 40 may be of or include PEI dissolved or otherwise mixed in a medium, such as a solvent like water, alcohol (e.g., methanol, ethanol, isopropanol, or other suitable alcohols), and/or suitable solvent(s) for PEI. PEI may comprise less than or equal to 15 percent by weight of the PEI-solvent mixture, less than or equal to 10 percent by weight, less than or equal to 8 percent by weight, less than or equal to 6 percent by weight, less than or equal to 4 percent by weight, less than or equal to 2 percent by weight, and/or less than or equal to 0.5 percent by weight, in certain example embodiments of this invention. Coating 40 may exhibit a contact angle $\theta$ preferably less than or equal to about 25 degrees, more preferably less than or equal to about 20 degrees, more preferably less than or equal to about 15 degrees, and even more preferably less than or equal to about 10 degrees, in certain example embodiments of this invention.

The combined thickness of surfactant-based layer 30 and coating 40 is preferably from about 0.2 to 5 µm, more preferably from about 0.5 to 3 micrometers, more preferably from about 1 to 2.5 micrometers, and even more preferably from about 1.3 to 2.1 micrometers.

Furthermore, surfactant-based layer 30 and/or coating 40 may be applied as liquids, then permitted to dry. The drying may occur, for example, in the ambient atmosphere or in a temperature- and/or pressure-controlled atmosphere, such as in an oven or vacuum oven. In addition, the composition of the atmosphere's gas may be controlled; that is, the drying may occur, for example, in an inert atmosphere of nitrogen or argon or in an atmosphere filled entirely with oxygen, carbon dioxide, or other gas. Furthermore, partial drying (or evaporation) is contemplated and included within the term "drying" and its variants.

To measure contact angle in one embodiment, a sessile drop 50 of a liquid such as water is placed on the substrate (e.g., with coating 40 thereon) as shown in FIG. 2. A contact angle θ between the drop 50 and underlying article comprising the substrate 20 and the supported layers appears, defining an angle θ depending upon the interface tension between the three phases at the point of contact. Though not drawn to scale, the contact angle depicted in FIG. 1 is greater than the contact angle depicted in FIG. 2, because the article in FIG. 2 is hydrophilic (i.e., results in a smaller contact angle).

Several exemplary embodiments illustrating the hydrophilic coatings of certain examples of this invention are set forth in the following example nos. 1-6. Table 1, which follows the description of the exemplary embodiments, summarizes certain properties of the examples.

Example #1

In this example, 0.4% by weight of polyethylenimine (PEI) was dissolved in 99.6% by weight of water. This solution was mixed for 2 minutes using a magnetic stir bar. A glass substrate with a 3 mm thickness was used, and was cleaned by water and then the surface was activated by using a commercially available nonionic solution known as "Chemwet 29" (supplied by ChemCor, Inc.). Flow coating was used to coat the substrate with the coating solution; flow coating occurs where a liquid is squirted or applied to a substrate or surface and gravity causes it to flow down and/or across the substrate or surface. The coating was dried in air for 30 minutes and then a PEI coating was deposited on the substrate over the surfactant by using a flow coating method. Then the coating was dried for 30 minutes in air at ambient temperature. The configuration of coating is illustratively depicted in the FIG. 1. The thickness of the Chemwet 29 coating and the PEI coating together was about 1.3 micrometers. The initial contact angle of this coating was measured and found to be 12.6°. For a comparison, the contact angle of the glass substrate, absent the coating, was 55°.

Example #2

In this example, example #1 was repeated except in that the amount of PEI was replaced with 2% by weight in the PEI/water solution. The initial contact angle of this coating was 9°. The summed thickness of the Chemwet 29 coating and the PEI coating was 1.4 micrometers.

Example #3

In this example, example #1 was repeated except in that the amount of PEI was replaced with 4% by weight in the PEI/water solution. The contact angle of this coating was 7.4°. The summed thickness of the Chemwet 29 coating and the PEI coating was about 1.6 micrometers.

Example #4

In this example, example #1 was repeated except in that the amount of PEI was replaced with 6% by weight in the PEI/water solution. The contact angle of this coating was 6.8°. The summed thickness of the Chemwetv29 coating and the PEI coating was 1.9 micrometers.

Example #5

In this example, example #1 was repeated except in that the amount of PEI was replaced with 8% by weight in the PEI/water solution. The contact angle of this coating was 7.7°. The summed thickness of the Chemwet 29 coating and the PEI coating was 2.1 micrometers.

Example #6

In this example, example #2 was repeated except in that the water was replaced with 98% by weight of isopropanol. The contact angle of this coating was 14.2°. The summed thickness of the Chemwet 29 coating and the PEI coating was 1.6 micrometers.

Example #7

Comparative Example

In this comparative example, 0.1% by weight of stearic acid was dissolved in 99.9% by weight of water. This solution was mixed for 2 minutes using a magnetic stir bar. A glass substrate with 3 mm thickness was used which was cleaned by water and then surface was activated by using a commercially available nonionic solution "Chemwet 29" (supplied by ChemCor, Inc.). Flow coating was used to coat the substrate using Chemwet 29. The coating was dried in air for 30 minutes and then stearic acid coating was deposited using a flow coating method. Then, the coating was dried for 30 minutes in air. The contact angle of this coating was 34.9°. The thickness of the Chemwet 29 coating and the stearic acid coating was 0.3 micrometers.

TABLE 1

Properties of Exemplary Coatings

| Example No. | System | Medium (% wt) | Thickness (µm) | Contact angle (degrees) | Nature of coating |
|---|---|---|---|---|---|
| 1 | 0.4% wt PEI | 99.6% wt water | 1.3 | 12.6 | Hydrophilic |
| 2 | 2% wt PEI | 98% wt water | 1.4 | 9 | Super Hydrophilic |
| 3 | 4% wt PEI | 96% wt water | 1.6 | 7.4 | Super Hydrophilic |
| 4 | 6% wt PEI | 94% wt water | 1.9 | 6.8 | Super Hydrophilic |
| 5 | 8% wt PEI | 92% wt water | 2.1 | 7.7 | Super Hydrophilic |
| 6 | 2% wt PEI | 98% wt isopropanol | 1.6 | 14.2 | Hydrophilic |
| 7 | 0.1% wt stearic acid | 99.9% wt water | 0.3 | 34.9 | n/a |

Table 1 illustrates that some exemplary coatings comprising PEI (see Examples 1-6) generally have contact angles θ less than 20 degrees. That is, certain embodiments of the present invention provide either hydrophilic (contact angle no greater than about 20 degrees) or super hydrophilic (contact angle no greater than about 10 degrees) coatings. It should be understood, of course, that the present invention is not limited to the exemplary embodiments summarized in Table 1 and that contact angles greater and smaller than those appearing in Table 1 are considered within the scope of certain embodiments of the present invention, and that other materials may also be used to supplement and/or replace those discussed herein.

Figure 3:
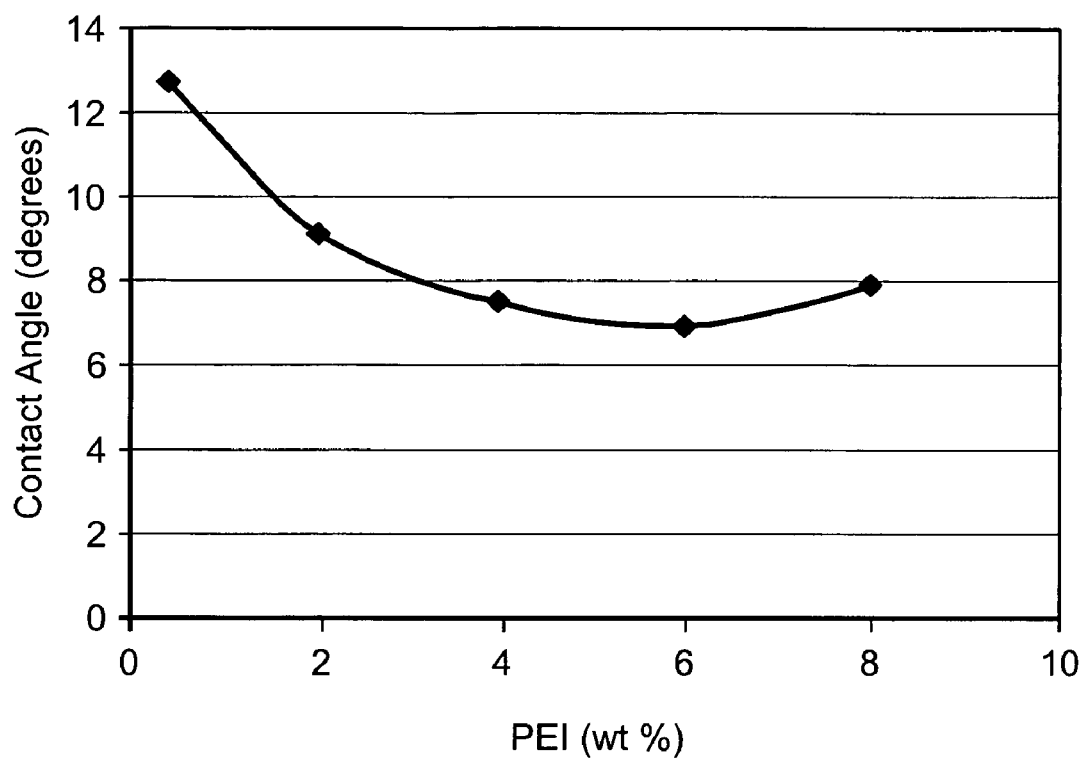
FIG. 3 is a graph illustrating the variation of contact angle $\theta$ with the concentration of PEI (polyethyleneimine) by weight in water in accordance with exemplary embodiments of the present invention.

FIG. 3 is a graph illustrating Examples 1-5 and showing the variation of contact angle with the concentration of PEI by weight in water.

Certain embodiments of the present invention may have particular applications with respect to anti-fog requirements in particular environments, including environments having a temperature in the range of 50° F. to −20° F. or below. For example, certain embodiments may have particular application in refrigeration and/or other cooling systems, such as freezers. For example, certain embodiments may have particular application as an anti-fog coating for an interior surface of a substantially transparent freezer door (e.g., for use in a supermarket or the like, so that shoppers can see food in the freezer through the freezer door). Thus, at least some embodiments have utility in refrigerators and freezers operating at temperatures less than 40° F., less than 32° F., or even 0 to 5° F. Some embodiments have utility in even colder environments, such as −20° F., −65° F., or even −120° F. The hydrophilic nature of the coating is advantageous in that it keeps water (and thus ice) from collecting on the interior surface of the freezer door thereby keeping the door substantially transparent for persons to be able to see clearly through the door into the freezer interior.

In addition to a home or commercial kitchen or pantry, certain environments, such as grocery stores, supermarkets, convenience stores, delicatessens, ice cream shops, vending machines, and other self-serve and non-self-serve purveyors of foodstuffs, may be suitable locations for the installation of at least some embodiments of the hydrophilic coatings described herein. These, and other environments, may have problems with condensation on the interior surfaces of the refrigerators and/or freezers, for instance, due to potentially frequent opening and closing of the doors.

Although described above with respect to a glass substrate 10, 20, certain embodiments relate to plastic or organic substrates instead of glass. In some embodiments, the substrate comprises a plastic substrate, either alone or in combination with glass. For example, the substrate may comprise at least an outer layer of polyvinyl butyral (PVB) or other suitable polymer or glass-like component.

As described and claimed herein, all numerical values and ranges of numerical values are approximate and thus include a reasonable or insignificant amount of deviation from the stated numerical values.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a coated article including a hydrophilic coating having hydrophilic properties, the method comprising:
dissolving at least polyethylenimine in at least water to form a polyethylenimine water mixture and mixing the polyethylenimine water mixture, wherein the polyethylenimine water mixture comprises less than or equal to 10 percent polyethylenimine by weight;
applying a surfactant to a surface of a substrate and drying to form a first layer, wherein the surfactant includes a nonionic surfactant and comprises a fluoroalkyl substituted polyethylene glycol;
applying the polyethylenimine water mixture over at least the first layer on the substrate and drying the polyethylenimine water mixture to form a second layer; and
wherein the second layer is hydrophilic, such that a sessile drop of water in contact with the second layer exhibits a contact angle of less than or equal to 25 degrees.

2. The method of claim 1, wherein the polyethylenimine water mixture comprises less than or equal to 8 percent polyethylenimine by weight.

3. The method of claim 1, wherein the polyethylenimine water mixture comprises less than or equal to 6 percent polyethylenimine by weight.

4. The method of claim 3, wherein the polyethylenimine water mixture comprises less than or equal to 4 percent polyethylenimine by weight.

5. The method of claim 4, wherein the polyethylenimine water mixture comprises less than or equal to 2 percent polyethylenimine by weight.

6. The method of claim 5, wherein the polyethylenimine water mixture comprises less than or equal to 0.5% percent polyethylenimine by weight.

7. The method of claim 1, wherein the contact angle is less than or equal to 20 degrees.

8. The method of claim 7, wherein the contact angle is less than or equal to 15 degrees.

9. The method of claim 8, wherein the contact angle is less than or equal to 10 degrees.

10. The method of claim 1, wherein the substrate comprises a glass substrate.

11. The method of claim 1, wherein the substrate comprises a plastic substrate.

12. The method of claim 11, wherein the substrate comprises polyvinyl butyral.

13. The method of claim 1, wherein the first layer and the second layer have a combined thickness of between 0.5 to 3 micrometers.

14. The method of claim 13, wherein the combined thickness is between 1 and 2.5 micrometers.

15. The method of claim 14, wherein the combined thickness is between 1.3 and 2.1 micrometers.

16. The method of claim 1, wherein the coated article is a freezer door, and the coating is provided on an interior surface of the freezer door.

17. A method of making a coated article including forming a hydrophilic coating having anti fog properties on a substrate, the method comprising:
dissolving at least polyethylenimine in at least a solvent to form a polyethylenimine solvent mixture and optionally mixing the polyethylenimine solvent mixture;
applying a surfactant to a surface of a substrate and drying to form a first layer, wherein the surfactant includes a nonionic surfactant and comprises a fluoroalkyl substituted polyethylene glycol;

applying the polyethylenimine solvent mixture over at least the dried surfactant on the substrate, and drying the polyethylenimine water mixture to form a second layer, wherein the drying of the polyethylenimine water mixture occurs in ambient atmosphere; and wherein the second layer is hydrophilic, such that a sessile drop of water in contact with the second layer exhibits a contact angle of less than or equal to 25 degrees.

18. The method of claim 17, wherein the solvent comprises an alcohol.

19. The method of claim 18, wherein the alcohol comprises one or more of isopropanol, methanol, and ethanol.

20. The method of claim 17, wherein the polyethylenimine solvent mixture comprises less than or equal to 15 percent polyethylenimine by weight.

21. The method of claim 17, wherein the substrate comprises glass or plastic.

22. The method of claim 17, wherein a sessile drop of water in contact with the second layer exhibits a contact angle of less than or equal to 15 degrees.

23. The method of claim 17, wherein the first layer and the second layer have a combined thickness of from about 0.5 to 3 micrometers.

24. The method of claim 17, wherein the coated article is a freezer door, and the coating is provided on an interior surface of the freezer door.

25. A method of making a coated article including a hydrophilic coating having hydrophilic properties, the method comprising:

dissolving at least polyethylenimine in at least water to form a polyethylenimine water mixture and mixing the polyethylenimine water mixture;

applying a surfactant to a surface of a substrate and drying to form a first layer, wherein the surfactant is a nonionic surfactant and comprises a derivative of polyethylene glycol comprising fluoroalkyl substituted polyethylene glycol;

applying the polyethylenimine water mixture over at least the first layer on the substrate and drying the polyethylenimine water mixture to form a second layer; and wherein the second layer is hydrophilic, such that a sessile drop of water in contact with the second layer exhibits a contact angle of less than or equal to 25 degrees.

26. The method of claim 25, wherein the coated article comprises a freezer door, and the coating is provided on an interior surface of the freezer door.

* * * * *